(12) United States Patent
Bader

(10) Patent No.: US 10,280,103 B1
(45) Date of Patent: *May 7, 2019

(54) TREATMENT OF SALINE STREAMS

(71) Applicant: Mansour S. Bader, College Station, TX (US)

(72) Inventor: Mansour S. Bader, College Station, TX (US)

(*) Notice: Subject to any disclaimer, the term of this patent is extended or adjusted under 35 U.S.C. 154(b) by 178 days.

This patent is subject to a terminal disclaimer.

(21) Appl. No.: 14/998,774

(22) Filed: Feb. 13, 2016

Related U.S. Application Data

(63) Continuation-in-part of application No. 14/544,436, filed on Jan. 6, 2015, and a continuation-in-part of application No. 14/544,317, filed on Dec. 22, 2014, which is a continuation-in-part of application No. 13/066,841, filed on Apr. 26, 2011, now Pat. No. 8,915,301.

(51) Int. Cl.
| | | |
|---|---|---|
| *C02F 9/00* | (2006.01) |
| *E21B 43/16* | (2006.01) |
| *C02F 1/06* | (2006.01) |
| *C02F 1/04* | (2006.01) |
| *C02F 5/06* | (2006.01) |
| *C02F 5/02* | (2006.01) |
| *C02F 101/10* | (2006.01) |
| *C02F 103/08* | (2006.01) |
| *C02F 103/10* | (2006.01) |

(52) U.S. Cl.
CPC .............. *C02F 9/00* (2013.01); *E21B 43/16* (2013.01); *C02F 1/042* (2013.01); *C02F 1/06* (2013.01); *C02F 5/02* (2013.01); *C02F 5/06* (2013.01); *C02F 2101/10* (2013.01); *C02F 2101/101* (2013.01); *C02F 2103/08* (2013.01); *C02F 2103/10* (2013.01); *C02F 2301/08* (2013.01)

(58) Field of Classification Search
USPC .................. 202/176; 203/84, 85, 10, 21, 88
See application file for complete search history.

(56) References Cited

U.S. PATENT DOCUMENTS

| | | | |
|---|---|---|---|
| 4,002,565 A * | 1/1977 | Farrell .............. | B01D 53/1418 |
| | | | 210/750 |
| 6,365,051 B1 | 4/2002 | Bader | |
| 6,663,778 B1 | 12/2003 | Bader | |
| 7,093,663 B1 | 8/2006 | Bader | |
| 7,392,848 B1 | 7/2008 | Bader | |

(Continued)

OTHER PUBLICATIONS

WHO. Desalination for Safe Water Supply. Guidance for the Health and Environmental Aspects Applicable to Desalination. Geneva 2007.*

(Continued)

*Primary Examiner* — Nina Bhat

(57) ABSTRACT

The invention presents innovative methods to de-scale sulfate-rich saline streams such as seawater and the like in conjunction with desalination processes. The effective de-scaling of such streams by the inventive methods: (1) enhances the performance, efficiency and cost effectiveness of desalination processes; and (2) allows the viable use of the de-scaled reject brine from desalination processes, for example, as a suitable saline water for oil-gas field's water injection operations to improve hydrocarbons recovery and/or as a feed stock for chlor-alkali industries.

10 Claims, 10 Drawing Sheets

(56) References Cited

U.S. PATENT DOCUMENTS

| | | |
|---|---|---|
| 7,789,159 B1 | 9/2010 | Bader |
| 7,934,551 B1 | 5/2011 | Bader |
| 7,963,338 B1 | 6/2011 | Bader |
| 8,197,696 B1 | 6/2012 | Bader |
| 8,915,301 B1 | 12/2014 | Bader |
| 8,961,916 B1 | 2/2015 | Bader |
| 2009/0260519 A1* | 10/2009 | Canari ................. B01D 53/507 95/235 |

OTHER PUBLICATIONS

Savage, Sam. et al. Interactions between Chloride and SUlfate or Silica Removals Using an Advanced Lime-Aluminum SOftening Process. Jan. 2007. Science.*
Lime Softening. Accessed from www.mrwa.com/Waterworksmnl/chapter%2016%20Lime%20Lime%20Softening.pdf on Nov. 6, 2018. (Year: 2015).*
U.S. Appl. No. 14/544,436, Bader.
U.S. Appl. No. 14/544,317, Bader.

* cited by examiner

TREATMENT OF SALINE STREAMS

RELATED APPLICATIONS

This application is a continuation-in-part of my U.S. patent application Ser. Nos. 14/544,436 and 14/544,317, all of which are continuation-in-parts of my U.S. patent application Ser. No. 13/066,841, filed Apr. 26, 2011, now U.S. Pat. No. 8,915,301.

BACKGROUND OF THE INVENTION

Oil-Fields Produced Water and the Like

Formation water is often produced concurrently with hydrocarbons. Higher amounts of produced water occur during the middle or later stage of the primary production after water breakthrough. A further increase in the amounts of produced water also occurs during the secondary treatment, in which large amounts of external saline water are injected from the surface into the reservoir formation to sustain hydrocarbons production. The amounts of produced water in some cases may reach 90% or more of the total produced fluids.

Since oil contains a large number (hundreds) of hydrocarbons, many of which are structurally undetermined or difficult to identify, the de-oiling of produced water is an extensive and expensive process. Partial or near efficient de-oiling of produced water might be targeted by two or three conventional processing stages. In the first stage, sludge catchers (e.g., skimmers or any other basic oil separation equipment along with coalescer) are used to separate oil droplets with sizes greater than 100 microns. The second stage targets the removal of dispersed oil droplets with sizes greater than 15-20 microns. Corrugated plate separators, hydrocyclones, centrifuges, electrostatic dehydrators, induced gas flotation without chemical addition, or a combination may be used in the second stage. The third (polishing) stage is used to separate oil contents with sizes of about 10 microns from produced water. Induced gas flotation with chemical addition, adsorption (e.g., nutshell filters), extraction (e.g., liquids, supercritical fluids or polymers) or filtration (e.g., microfiltration or ultrafiltration) are frequently used in the polishing stage.

Depending on the formation matrix and the depth of oil wells, produced waters may be a hyper-saline chloride-type that is rich in both sodium and calcium ions. Chloride-rich produced waters that are high in calcium are generally high in alkaline earth cations such as strontium, barium, and in some cases radium. Some of the naturally occurring isotopes of strontium (Sr-87) and barium (Ba-130 and Ba-132) are radioactive. In addition, the availability of radium in produced water suggests that the decay series of radium's isotopes is common and such water is radioactive. Radium sources in produced water are either uranium (U-238) or thorium (Th-232). U-238 and Th-232 exist in subsurface formations as immobile species whereas their daughter nuclides (radium and its isotopes) are transported to the surface via produced water. Once radium isotopes are leached from their lithological origin, they are no longer supported by their ancestors and thus they develop their own decay series. Naturally Occurring Radioactive Materials (NORM) in produced water pose external (near any processing equipment) and internal (during maintenance or workover) radiation hazards. NORM also renders produced waters at the surface as radioactive waste streams. The cost of handling the NORM hazards is substantial (e.g., analysis, prevention if possible, treatment, transportation, storage, disposal, equipment decontamination and long-term liability).

Produced water is thus an unwanted waste stream that once its' brought to the surface it becomes too expensive to treat by conventional methods. The cheapest possible way to deal with produced water may be direct disposal by re-injecting it without treatment into abandoned oil wells, dry holes, geologically selected injection wells, or salt caverns. Such disposable sites, however, may not be easily available for producers (e.g., technically, environmentally or economically prohibitive).

On the other hand, produced water in some areas may be too valuable to waste. However, the only way to offset the high treatment cost of produced water is to render it harmless (NORM removal) and to extract economic values (recovery of oil, salts, and usable water) from it using innovative and cost effective methods.

Inspection of Table 1 reveals that at least three groups of inorganic species can be selectively segregated from produced water (chloride-type). In the first group of inorganic species, potential radioactive alkaline earth cations (strontium, barium and radium along with its decay series) in the form of sulfate can be selectively separated from produced water. Once produced water is selectively depleted of such radioactive and pyrophoric species, produced water can be used for applications such as, for example, oil-fields water injection operations, fire extinguishing and dust control in desert areas.

The second group of inorganic species may include the simultaneous or sequential separation of magnesium hydroxide (brucite) and calcium chloroaluminate or chloroferrate (instead of calcium chloride as given in one of my previous inventions, U.S. Pat. No. 7,963,338) from produced water as valuable commodities. The recovered brucite can be used as: (1) an agent to scrub air pollutants or to remove transition metals from aqueous streams; (2) an absorbent for silica removal of water and wastewater; (3) a coagulant in water and wastewater treatment; (4) an acid neutralizer or a base stabilizer; and (5) an odor controller. On the other hand, one of the remarkable features of the recovered calcium chloroaluminate or calcium chloroferrate is that its interlayer anions (chloride) can be exchanged with various charged species. Such a high anion-exchange capacity can be employed, for instance, to selectively deplete sulfate from saline stream and the like in a precipitation setup or in an anion-exchange setup. In addition, calcium in the form of chloroaluminate or chloroferrate is very tolerant to high temperatures.

The third group of inorganic species in produced water includes sodium and potassium chloride (sylvinite). Sylvinite is a salt that consists of sodium and potassium chloride but dominated by sodium chloride. Sylvinite is the dominant salt in produced water, and thus it's partial or near complete separation from produced water will also produce partial or near complete de-ionization of produced water. Sylvinite can be used in applications such as road de-icing, animals feeding, water softening and food processing.

My U.S. Pat. No. 8,915,301 provided innovative near zero- or zero-liquid-discharge methods (de-oiling, de-NORMing, de-scaling and de-salting) that allow the conversion of produced waters as unwanted waste streams to a variety of selectively recoverable by-products.

Seawater and the Like of Sulfate-Rich Streams

FIG. 1, for example, shows an oversimplified flow diagram for a recently installed Multi-Stage Flash (MSF)

seawater desalination plant in the Arabian Gulf area. The plant mainly consists of three major sections: (1) brine heater; (2) heat recovery train; and (3) heat rejection train. On the hot side of the plant, the brine heater is driven by low-pressure and medium-pressure steam. The brine heater is the driving unit for the flashing process by heating the recycle brine to the desired or designed top brine temperature. The top brine temperature is thus one of the most important parameter in thermal desalting plants. The flashing process of the recycle brine takes place in the heat recovery and heat rejection trains. The number of stages in the heat recovery train is typically 20 while the number of stages in the heat rejection train is 3. Within the heat recovery and heat rejection trains, vapor flashes off and the brine saturation temperature in each consecutive stage gradually decreases. As such, the brine flows across the stages from the hotter to the colder side of the heat recovery and heat rejection trains without any pumping aids. The flashed off vapor condenses on the tubes side of the condenser/pre-heater units and accumulates across the heat recovery and heat rejection trains as distillate. The released latent heat of the condensed vapor is used to preheat the recycle brine.

On the cold side of the plant, pretreated (may include screening, chlorination, coagulation and filtration) seawater feed stream along with seawater cooling stream introduce into condenser/pre-heater units of the last stage of the heat rejection train. As seawater feed stream leaves the heat rejection train, it's mixed with additives (e.g., anti-scale and anti-foam), and passed through a vacuum de-aerator, which is an integral part of the MSF plant. The de-aerated seawater feed stream is mixed with a portion of the reject brine to form the recycle brine. The recycle brine is then mixed with an oxygen scavenger and introduced to the last stage of the heat recovery train. A portion of the cooling seawater stream leaving the heat rejection train is recycled for mixing with the incoming seawater cooling stream to maintain a constant temperature at the entrance of the heat rejection train. The remaining portions of seawater cooling stream and the reject brine are blown down back to the sea.

However, the presence of thermally unstable ions (bicarbonate, magnesium and calcium) severely limits the design capacity of seawater desalting plants. Bicarbonate in seawater feed stream would thermally breakdown in pre-heaters to produce hydroxide ions and carbon dioxide. The release of the hydroxide ions (increases the pH value) along with the rise in seawater temperature may trigger some brucite precipitation. In the recently installed MSF plant (FIG. 1), the pre-heated seawater in the heat rejection train would allow partial thermal breakdown of bicarbonate to release carbon dioxide (to be removed by the vacuum de-aerator of the MSF plant) while brucite precipitation remains unsolved. It's worth noting that the typical practice in desalination plants is that the seawater pre-treatment section includes a de-alkalization step by dosing an acid (e.g., sulfuric acid) to convert bicarbonate to carbon dioxide, removing carbon dioxide by a vacuum de-aerator, and nearly neutralizing the pH of recycle brine by adding a caustic solution (e.g., sodium hydroxide).

The calcium ion has two possible forms of sulfate (anhydrite and/or hemihydrate) at the plant top brine temperatures range (90-110° C.). The solubility limits of calcium sulfate anhydrite or hemihydrate are inversely and steeply proportional with temperatures. Inhibitors are added to delay the precipitation of such sulfate scales. However, the temperature tolerance limit of the added inhibitor dictates the top brine temperature (e.g., the temperature limit for polyphosphates is 90° C. and for polycarboxylates or polymeric is 110° C.). In addition, their limited effect in solving sulfate scale dictates the maximum total dissolved solids (IDS) of the reject brine (TDS of the blow down brine stream is limited to about 65,000 mg/L to avoid severe sulfate scale problems within the heat recovery and heat rejection trains).

An effective de-scaling (alkaline and far more importantly sulfate scale) step is thus essential in seawater desalination plants. Such a de-scaling step would allow: (1) better performance ratio (ratio of distillate to steam load) and thus more efficient and cost effective plants; (2) the use of a higher volume of reject brine for recycling, which in turn, leans to smaller volumes of both the brine blown down stream, and more importantly seawater feed stream (savings on pumping power, chlorination, filtration, and additives); (3) the elimination of scale inhibitors; (4) the plant to reach its designed top brine temperature (e.g., 130-150° C.) and thus increases distillate production; (5) fewer shut-downs for de-scaling maintenance; and (6) slower decrease of heat exchange coefficients.

Thus, the objective of this invention is to effectively de-scale sulfate-rich saline streams such as seawater and the like in conjunction with desalination processes. The inventive methods not only enhance the performance, efficiency and cost effectiveness of desalination processes, but also allow the viable use of the de-scaled reject brine from desalination processes, for example, as a suitable saline water for oil-gas fields' water injection operations to improve hydrocarbons recovery and/or as a feed stock for chlor-alkali industries.

SUMMARY OF THE INVENTION

In one aspect, the present invention provides a method for separating magnesium in the form of brucite and sulfate in the form of calcium sulfoaluminate or calcium sulfoferrate from a sulfate-rich saline stream to feed a Multi-Stage Flash (MSF) desalination process. The inventive method comprises the steps of: (a) removing magnesium and sulfate from a de-aerated sulfate-rich saline stream to produce a de-scaled saline stream; (b) feeding the de-scaled saline stream to a heat recovery train of the MSF desalination process to produce a distillate and a de-scaled reject brine; (c) blending a portion of the de-scaled reject brine with a makeup of the de-aerated sulfate-rich saline stream to produce a recycle brine with low concentrations of magnesium and sulfate; (d) removing magnesium and sulfate from the recycle brine to produce the de-scaled recycle brine; and (e) feeding the de-scaled recycle brine to the heat recovery train of the MSF desalination process to produce the distillate and the de-scaled reject brine to be blown down; or (f) using the de-scaled reject brine for oil-gas fields' injection operations to improve hydrocarbons recovery or as a feed stock for chlor-alkali industries. Magnesium and sulfate are removed from the de-aerated sulfate-rich saline stream in step (a) by: (i) mixing the de-aerated sulfate-rich saline stream with appropriate amounts of calcium and aluminum additives, or calcium and iron additives through a premixing device to form precipitates comprising brucite and calcium sulfoaluminate or calcium sulfoferrate in a precipitator unit; and (ii) removing precipitates from the de-aerated sulfate-rich saline stream by a filtration unit to produce the de-scaled saline stream and dewatered precipitates. Magnesium and sulfate are removed from the recycle brine in step (d) by: (i) mixing the recycle brine with appropriate amounts of calcium and aluminum additives, or calcium and iron additives through the premixing device to form precipitates comprising brucite and calcium sulfoaluminate or calcium sulfoferrate in the precipitator unit; and (ii) removing the precipitates from the recycle brine by the filtration unit to produce the de-scaled recycle brine and dewatered precipitates. The sulfate-rich saline stream is seawater, brine from seawater desalination plants, natural brine, produced water, brackish water, flue gas desulphurization spent water, agricultural drainage water, acid mine drainage water, mineral slurry transport water, paper mills spent water, aluminum anodizing spent water, spent water from fertilizer production, lime slaking, spent water from textile, or a combination thereof. The calcium additive is calcium chloroaluminate, calcium chloroferrate, lime, hydrated lime, or a combination thereof. The aluminum additive is calcium chloroaluminate, calcium aluminate, sodium aluminate, aluminum acetate, aluminum chloride, aluminum hydroxide, aluminum nitrate, aluminum sulfate, or a combination thereof. The iron additive is calcium chloroferrate, calcium ferrate, sodium ferrate, iron hydroxide, iron nitrate, iron chloride, or a combination thereof.

In another aspect, the present invention provides a method for separating magnesium in the form of brucite and sulfate in the form of calcium sulfoaluminate or calcium sulfoferrate from a sulfate-rich saline stream to feed a Multi-Stage Flash (MSF) desalination process. The inventive method comprises the steps of: (a) removing magnesium and sulfate from the sulfate-rich saline stream to produce a de-scaled saline stream; (b) feeding the de-scaled saline stream to a heat recovery train of the MSF desalination process directly or through a vacuum de-aerator of the MSF desalination process to produce a distillate and a de-scaled reject brine; (c) blending a portion of the de-scaled reject brine with a makeup of the sulfate-rich saline stream to produce a recycle brine with low concentrations of magnesium and sulfate; (d) removing magnesium and sulfate from the recycle brine to produce the de-scaled recycle brine; and (e) feeding the de-scaled recycle brine to the heat recovery train of the MSF desalination process directly or through the vacuum de-aerator of the MSF desalination process to produce the distillate and the de-scaled reject brine to be blown down; or (f) using the de-scaled reject brine for oil-gas fields' injection operations to improve hydrocarbons recovery or as a feed stock for chlor-alkali industries. Magnesium and sulfate are removed from the sulfate-rich saline stream in step (a) by: (i) mixing the sulfate-rich saline stream with appropriate amounts of calcium and aluminum additives, or calcium and iron additives through a premixing device to form precipitates comprising brucite and calcium sulfoaluminate or calcium sulfoferrate in a precipitator unit; and (ii) removing precipitates from the sulfate-rich saline stream by a filtration unit to produce the de-scaled saline stream and dewatered precipitates. Magnesium and sulfate are removed from the recycle brine in step (d) by: (i) mixing the recycle brine with appropriate amounts of calcium and aluminum additives, or calcium and iron additives through the premixing device to form precipitates comprising brucite and calcium sulfoaluminate or calcium sulfoferrate in the precipitator unit; and (ii) removing the precipitates from the recycle brine by the filtration unit to produce the de-scaled recycle brine and dewatered precipitates.

In yet another aspect, the present invention provides a method for separating magnesium in the form of brucite and sulfate in the form of calcium sulfoaluminate or calcium sulfoferrate from a sulfate-rich saline stream to feed a desalination process. The inventive method comprises the steps of: (a) removing magnesium and sulfate from the sulfate-rich saline stream to produce a de-scaled saline stream; (b) feeding the de-scaled saline stream to a desalination process to produce a distillate and a de-scaled reject brine; (c) blending a portion of the de-scaled reject brine with a makeup of the sulfate-rich saline stream to produce a recycle brine with low concentrations of magnesium and sulfate; (d) removing magnesium and sulfate from the recycle brine to produce a de-scaled recycle brine; and (e) feeding the de-scaled recycle brine to the desalination process to produce the distillate and the de-scaled reject brine to be blown down; or (f) using the de-scaled reject brine for oil-gas fields' injection operations to improve hydrocarbons recovery or as a feed stock for chlor-alkali industries. Magnesium and sulfate are removed from the sulfate-rich saline stream in step (a) by: (i) mixing the sulfate-rich saline stream with appropriate amounts of calcium and aluminum additives, or calcium and iron additives through a premixing device to form precipitates comprising brucite and calcium sulfoaluminate or calcium sulfoferrate in a precipitator unit; and (ii) removing precipitates from the sulfate-rich saline stream by a filtration unit to produce the de-scaled saline stream and dewatered precipitates. Magnesium and sulfate are removed from the recycle brine in step (d) by: (i) mixing the recycle brine with appropriate amounts of calcium and aluminum additives, or calcium and iron additives through the premixing device to form precipitates comprising brucite and calcium sulfoaluminate or calcium sulfoferrate in the precipitator unit; and (ii) removing the precipitates from the recycle brine by the filtration unit to produce the de-scaled recycle brine and dewatered precipitates. The desalination process is multi-stage flash, multi-effects, vapor-recompression, vacuum membrane distillation, direct contact membrane distillation, membrane osmotic distillation, forward osmosis, reverse osmosis, or a combination thereof.

This invention is of particular interest in connection with applications such as, but not limited to, oil and gas, saline water desalination, mining, geothermal power plants, chlor-alkali, flue gas desulphurization, gypsum production, coal or oil fired power plants, industrial boilers, steam generation, cooling towers, agricultural drainage water, acid mine drainage water, textile, treatment of contaminated water sources such as surface or ground water by natural brine or oil-gas fields brine or brine resulting from all kinds of mining operations (sparingly soluble inorganics, toxic metals, lanthanides, actinides, etc.), treatment of natural brine or oil-gas fields brine or brine resulting from all kinds of mining operations to prevent contaminating water sources such as surface or ground water, and other similar operations.

This invention is not restricted to use in connection with one particular application. This invention can be used, in general, for the selective removal of inorganic from aqueous streams with precipitates ranging from macro- to submicron-sizes. Further objects, novel features, and advantages of the present invention will be apparent to those skilled in the art upon examining the accompanying drawings and upon reading the following description of the preferred embodiments, or may be learned by practice of the invention.

BRIEF DESCRIPTION OF THE DRAWINGS

FIG. 8 illustrates a possible flow diagram for integrating the invented method with MSF plants and the like.

FIG. 9 illustrates another possible flow diagram for integrating the invented method with MSF plants and the like.

DESCRIPTION OF THE PREFERRED EMBODIMENT

The Precipitation Concept

Figure 1:
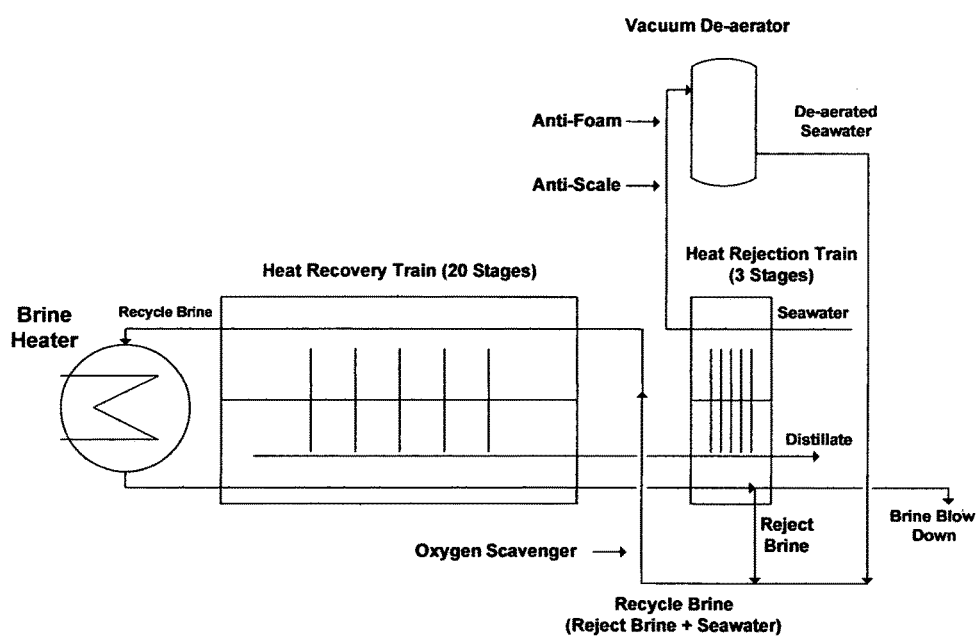
FIG. 1 illustrates an oversimplified flow diagram for a recently installed MSF desalination plant in the Arabian Gulf area.

I have previously invented the Liquid-Phase Precipitation (LPP) process for the separation of inorganic species from aqueous streams. The effect of the separation in the LPP process is to intermix the aqueous solution with a suitable solvent at ambient temperature and atmospheric pressure to form selective precipitates. The suitable solvents are those which have the capability to meet two basic criteria.

The first criteria is the suitability to precipitate targeted inorganic species from aqueous solutions. The selected organic solvent must be miscible with the aqueous phase. Of equal importance, the targeted inorganic species must be sparingly soluble in the organic solvent. The addition of such a solvent to an inorganic-aqueous solution leads to the capture of part of the water molecules and reduces the solubility of inorganic species in the water which form insoluble precipitates. The solubility of the targeted inorganic species in the organic solvent is a critical factor in achieving the degree of saturation. Therefore, solubility related factors such as ionic charge, ionic radius, and the presence of a suitable anion in the aqueous solution (its effect on pH rate) play an important role in affecting and characterizing precipitates formation.

The second criteria is suitability for overall process design. For ease of recovery, the selected solvent must have favorable physical properties such as low boiling point, high vapor pressure, high relative volatility, and no azeotrope formation with water. From a process design standpoint, the selected solvent must have low toxicity since traces of the organic solvent always remain in the discharge stream. Further, the selected solvent must be chemically stable, compatible with the process, and relatively inexpensive.

Several solvents have been identified for potential use in the LPP process. These solvents are isopropylamine (IPA), ethylamine (EA), propylamine (PA), dipropylamine (DPA), diisopropylamine (DIPA), diethylamine (DEA), and dimethylamine (DMA). However, IPA is the preferred solvent in the LPP process. The preference of IPA is attributed to its high precipitation ability with different basic salts, favorable properties (boiling point: 32.4° C.; vapor pressure: 478 mmHg at 20° C.); and minimal environmental risks.

Improving the performance of LPP is always a target. One of the targeted improvements is to minimize, if not eliminate, the use of the amine solvent. Inorganic additives can alternatively replace organic additives or can be used in addition to organic additives to induce precipitation of targeted species. The suitable inorganic additives for LPP are those that can form an insoluble inorganic-based mineral of targeted charged species in a saline stream. Such inorganic additives should preferably be recoverable and recyclable, useable as a useful by-product, or produced locally from reject or waste streams. Such inorganic additives should also not themselves constitute pollutants. Several inorganic additives were identified, developed, and tested for LPP.

A second targeted improvement for LPP is to produce controllable precipitates that are uniformly distributed with high yield and preferably in submicron sizes. Submicron precipitates are fundamentally stable and form spontaneously if a narrow resistance time distribution is improvised and/or a surface active agent (naturally existing or induced) sufficiently acts as a dispersant to prevent immediate agglomeration of the newly formed precipitates. Submicron precipitates are thus dispersed phase with extreme fluxionality. On the other hand, non-spontaneous unstable macro-size precipitates will form if given sufficient time to rest.

The state (stabile, metastabe, or unstable) of given precipitates can be expressed thermodynamically by the Gibbs-Helmholtz relation as follows:

$$\Delta G = \Delta H - T \Delta S \quad (1)$$

where $\Delta G$ is the free energy of precipitates (provided by, for instance, mechanical agitation or other means), $\Delta H$ is the enthalpy that represents the binding energy of the dispersed phase precipitates in the saline stream, T is the temperature, and $\Delta S$ is the entropy of the dispersed phase precipitates (the state of precipitates disorder). The binding energy ($\Delta H$) can be expressed in terms of the surface tension ($\tau$) and the increase in the surface area ($\Delta A$) as follows:

$$\Delta G = \tau \Delta A - T \Delta S \quad (2)$$

When the introduced free energy into the saline stream exceeds the binding energy of precipitates, individual precipitates are broken down and redistributed. In addition, when a surface active agent is present in the saline stream as an effective dispersant, $\tau$ is reduced and thus the precipitates binding energy is diminished. Furthermore, part of the introduced energy may not contribute to precipitates deflocculating but it dissipates in the aqueous stream in the form of heat which reduces viscosity. All of these factors increase precipitates disorder (positive entropy). As such, the change in the entropy ($\Delta S$) quantitatively defines precipitates dispersion.

I have thus developed the Compressed-Phase Precipitation (CPP) process to achieve sub-micron precipitates in certain applications. CPP is conceptually similar to LPP in which the targeted inorganic species must be nearly insoluble in the amine solvent whereas the mother solvent (water) is miscible with the amine solvent. However, the difference is that fluids in the CPP process can be subjected to pressure and/or temperature manipulations, or fluids modifications to force unusual thereto-physical properties (e.g., exhibit liquid-like density but with higher diffusivity, higher compressibility and lower viscosity).

The fast diffusion combined with low viscosity of a compressed amine solvent into an aqueous phase produces faster supersaturation of targeted ionic species, and their possible precipitation in the desired and sub-micron and micron sizes. Thus, the precipitate-size as well as the precipitate-size distribution, morphology, and crystal structure can be controlled. Achieving faster supersaturation would, in turn, minimize the use of the amine solvent, reduce the size of precipitation vessels, and allow the recovery of targeted ionic species in the desired precipitates shape and distribution.

Several factors could influence the performance of the precipitation process. Among such factors are: (1) the origin of the saline stream along with the identity and concentrations of its targeted ionic species; and (2) the way the additive (inorganic, organic, or both) is premixed or mixed with the saline stream to induce precipitation.

The Targeted Ions in Oil-Fields Produced Water and the Like

The precipitation process can be employed as a stand-alone process for the selective and sequential removal of inorganic species from oil-fields produced water and the like. The primary objective is to effectively: (1) deplete radioactive alkaline earth cations (mainly barium, radium and its decay series) preferably in the form of sulfate from produced water; (2) recover brucite; and (3) recover calcium in the form chloroaluminate or chloroferrate. The second objective is the overall economic attractiveness of the precipitation process that lies within the optimum and minimum use of the precipitation solvent as well as the purity of the precipitated inorganic species as a waste (radioactive species) or salable by-products (brucite and calcium chloroaluminate or chloroferrate) to offset the cost of the process. The third objective is to provide an environmentally benign (near zero- or zero-discharge) process by efficiently utilizing unwanted waste streams such as produced water from hydrocarbons production facilities by simultaneously rendering such streams harmless (removal of radioactivity) and producing valuable products (usable salts and water).

Figure 2:
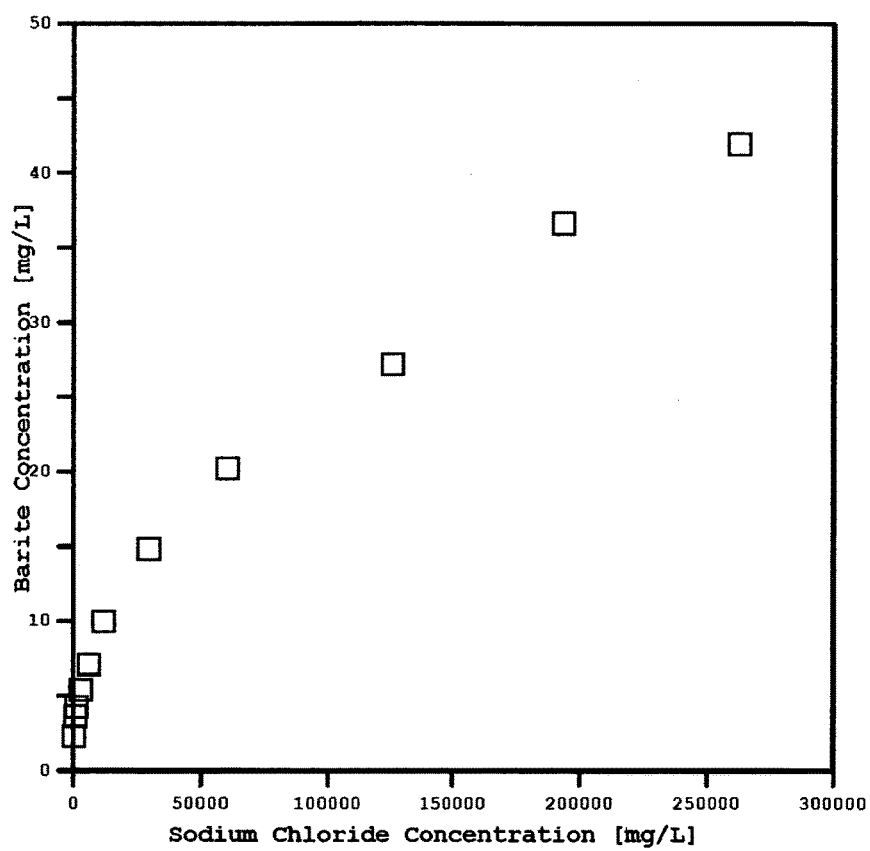
FIG. 2 illustrates the saturation limits of barite as a function of sodium chloride concentrations at ambient temperature.
Figure 3:
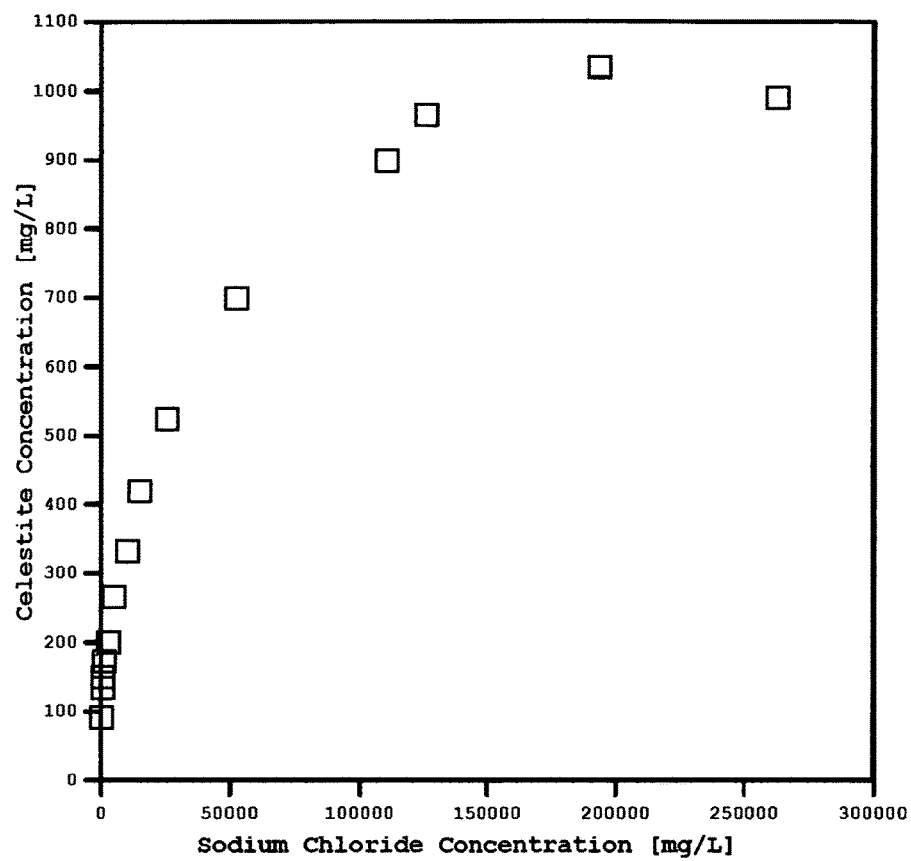
FIG. 3 illustrates the saturation limits of celestite as a function of sodium chloride concentrations at ambient temperature.

Produced waters from hydrocarbons production facilities are typically rich in alkaline earth cations such as calcium, strontium, barium and possibly radium. These cations exist in produced water in the soluble chloride forms. In the forms of sulfate, however, such cations are sparingly soluble in water. FIGS. 2 and 3 show, for instance, the solubility limits of strontium sulfate (celestite), and barium sulfate (barite) as a function of sodium chloride concentrations (the dominant salt in produced water) at ambient temperature. The solubility limit of barite is about one and one-half orders of magnitude lower than the solubility limit of celestite.

Since the naturally occurring radioactive isotopes of barium (Ba-130 and Ba-132) may exist in produced water and the chemical properties of radium are nearly similar to barium, such species along with their radioactivity can be separated and isolated from produced water in the form of sulfate once produced water is brought to the surface. As shown in Table 1, there may be a sufficient amount of sulfate (2.3 meq./L) in produced water to pair with barium (0.2 meq./L). In addition, if the removal of strontium (12.2 meq./L) is also desirable, the deficiency in amount of sulfate to completely pair with strontium in produced water must be overcome.

The unbalanced and small portion of strontium in produced water can be matched (or exceeded) with sulfate from a sulfate-rich saline stream to precipitate strontium along with barium and radium in the form of sulfate without or with the aid of the amine solvent as a precipitation agent. Possible sources for sulfate as a seeding ion to precipitate barite and celestite would be seawater, sulfate-rich natural brine, sulfate-rich agricultural drainage water, or brine from seawater desalination plants such as MSF, reverse osmosis (RO), Multi-Effects (MED), and the like. Table 1 shows ions concentrations in a sample of chloride-type produced water along with some samples of possible sulfate-rich saline streams.

Table 2 presents ions material balance between chloride-type produced water and the required volume of sulfate-rich saline water to mainly satisfy the unbalanced portion of strontium in the blended produced water and sulfate-rich saline water. To satisfy the precipitation of barite and celestite, about 20% of total blended volume of produced water and sulfate-rich saline water should be supplied by seawater, sulfate-rich natural brine, sulfate-rich produced water and the like; or about 10% of such a total blended volume may be supplied by sulfate-rich brine from seawater desalination plants (e.g., MSF, MED, RO, etc.).

However, an alternative possible sulfate source would be the addition of a small but sufficient amount of aluminum sulfate or iron sulfate to produced water. The selected amine solvents for precipitation are weak bases, which do not furnish the hydroxide ion directly by dissociation. The addition of aluminum or iron sulfate along with an amine solvent to produced water would instantly liberate sulfate (the associated anion). Sulfate would bond with barium and strontium to be precipitated as barite and celestite along with aluminum or iron hydroxide. The added amount of the amine solvent would be extremely small. Otherwise, it would also trigger the simultaneous precipitation of brucite since the solubility limit of brucite is about 1.3 mg/L at 20° C. The nucleation (induction) period for brucite precipitation is also very fast (about one second) and decreases sharply with increasing the magnesium concentration. Thus, the pH of the mixed stream (the amine solvent and produced water) is the key to allow insignificant or significant precipitation of brucite in the same precipitation stage. It is worth noting that the addition of aluminum or iron sulfate along with the amine solvent to precipitate strontium, barium and radium would also: (1) allow the precipitation of impurities such as transition metals (e.g., zinc, manganese, copper, aluminum, phosphate, iron, cobalt, etc.) that exist in very small concentrations in produced water; and (2) remove to varying degrees silica, boron as well as scale and corrosion inhibitors (that produced water typically contains) The removal of scale and corrosion inhibitors is an important issue, since such inhibitors may delay the precipitation process (slow down precipitates growth and/or disperse precipitates).

Once radioactive species (mainly barium and radium) in the form of sulfate along with brucite are selectively and sequentially separated from produced water, the remaining inorganic salts in produced water would be calcium chloride and sodium-potassium chloride (sylvinite). Table 1 (S1) indicates that calcium chloride concentration in produced water is about 25% of the total salts. If sources of aluminum or iron along with the amine solvent (or other sources of hydroxide) are added to produced water, calcium chloride can be recovered as calcium chloroaluminate or calcium chloroferrate. In this case, aluminum sources may include, but not limited to, calcium aluminate, sodium aluminate, aluminum acetate, aluminum chlorohydrate, aluminum hydroxide, aluminum nitrate, aluminum chloride, or a combination thereof. Iron sources may include, but not limited to, calcium ferrate, sodium ferrate, iron hydroxide, iron nitrate, and iron chloride. However, the cheapest possible source of aluminum or iron would be waste sludge from water treatment plants (e.g., aluminum chloride or iron chloride). Any of the selected amine solvents would provide the hydroxide ion to reach the optimum pH for the precipitation of calcium chloroaluminate or calcium chloroferrate.

Since chloride concentration in some produced water is about 4-times calcium concentration, the addition of a calcium source (such as lime or hydrated lime) rather than, or in addition to, the amine solvent: (1) would not only increase the amount of the precipitated calcium chloroaluminate or chloroferrate but also would minimize, if not eliminate, the use of the amine solvent (furnish the hydroxide ion); and thus (2) could further reduce the TDS of the treated produced water (binding with an additional amount of the chloride ion) to make it more amenable to desalination methods.

The Targeted Ions in Seawater and the Like of Sulfate-Rich Streams

The removal of sulfate from seawater and the like of sulfate-rich streams can be attained by forming an insoluble sulfate-based mineral. Calcium sulfoaluminate or calcium sulfoferrate are such possible minerals. Their solubility limits are approximately 1 mg/L at 20° C., and thus they are capable of binding most of the sulfate ion in seawater. However, the formation of such minerals precipitates requires the addition of a calcium source as well as an aluminum or iron source to properly engage the existing concentrations of calcium and sulfate ions in seawater and the like of sulfate-rich streams.

The possible aluminum sources include, but not limited to, calcium chloroaluminate, calcium aluminate, sodium aluminate, aluminum acetate, aluminum chloride, aluminum hydroxide, aluminum nitrate, aluminum sulfate, or a combination thereof. The possible iron sources include, but not limited to, calcium chloroferrate, calcium ferrate, sodium ferrate, iron hydroxide, iron nitrate, iron chloride, or a combination thereof. However, calcium chloroaluminate and calcium chloroferrate are of particular interest in this invention since they are layered double hydroxides which contain divalent and trivalent cations (calcium along with aluminum or iron) in the outside main layers while their interlayers contain anions (chloride) and water molecules. Within the outside layers, a fraction of calcium hydroxide sheets are substituted with aluminum or iron (trivalent cations), which provides permanent positive charge on the hydroxide layers. The positively charged hydroxide layers are counter-balanced by the negatively charged anion interlayers.

There are several advantages for using calcium chloroaluminate or calcium chloroferrate in this invention. First, their interlayers are highly exchangeable. Sulfate, as a divalent anion, would have a higher affinity to replace chloride (as a monovalent anion) to bind with calcium-aluminum or calcium-iron and thus form calcium sulfoaluminate or calcium sulfoferrate. Second, they provide a dual source for both divalent (calcium) and trivalent (aluminum or iron) cations. Third, they also furnish the needed hydroxide ion for pH elevation. Fourth, they can be produced locally from, for instance, oil-fields produced water and the like as discussed above.

It's worth noting that the precipitation of brucite along with calcium sulfoaluminate or calcium sulfoferrate from seawater or other sulfate-rich saline streams can be conducted respectively in two separate stages or simultaneously in a single stage.

Injection Methods

Various jet injection and mixing devices such as premixed nozzles, coaxial nozzles, spray nozzles, vibrating nozzles, ultrasonic nozzles, vortex nozzles, and others can be used in applying the precipitation process. Although the effectiveness of the process lies within the ability of the amine solvent to precipitate inorganic species, the efficiency of the injection device (contact between the amine solvent and/or other additives, and the saline stream) is also important. If the nucleation (precipitate formation) and condensation (precipitate growth) mechanisms are fast enough, then precipitates will reach a high degree of supersaturation in a very short period of time and within the precipitator vessel. This would allow appreciable reduction in the size of the precipitator vessel and a high degree of precipitates uniformity in submicron sizes.

A possible injection method is to use a nozzle to co-introduce and pre-mix a saline stream with the amine solvent before entering the precipitation vessel. This provides a simple and efficient injection method for intensive mass-transfer and fast nucleation of the targeted inorganic species.

A second possible injection method is a concentric nozzle in which a saline stream flows through the inner tube while the amine solvent flows through the coaxial annulus. Therefore, the main mechanism of the jet hydrodynamic mixing is that the saline stream draws in the amine fluid from the surrounding mass of such a fluid. The smaller the nozzle diameters are the higher the inlet velocities of the compressed fluids. This provides an efficient micro-mixing. The highest nucleation of precipitates takes place at the border of the jet stream (region of contact) whereas the highest condensation of precipitates takes place at the center of the jet stream due to the high turbulence impact and inorganic concentrations in the center of the jet.

A third possible method is to inject the amine solvent (and/or other additives) and a saline stream into the precipitator vessel via two separate nozzles. If the velocities of the injected fluids are not equal, however, fast and/or a significantly high degree of supersaturation may not be achieved. Therefore, the induction and condensation periods for precipitates will be longer. This could affect the design of the precipitator vessel (the need for a larger instead of a smaller precipitator vessel, further mixing, or precipitates seeding). In addition, a moderate degree of supersaturation leads to larger precipitates.

Underestimation of the mixing step between a saline stream and the amine solvent may lead to ineffective design of precipitation vessels. Uniform precipitates are highly desirable for industrial applications. In addition, the quality of dewatering is directly affected by precipitates uniformity and size distribution.

De-Salting Produced Water

De-NORM and Partially De-Salt Produced Water

Figure 4:
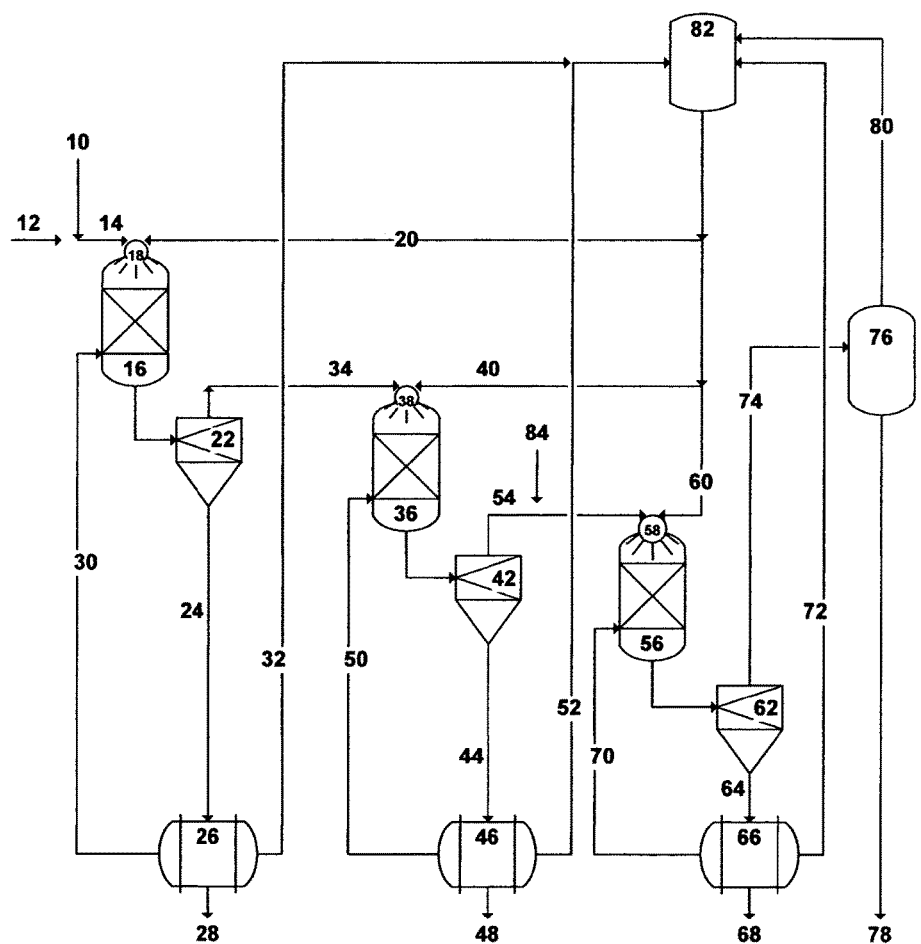
FIG. 4 illustrates a possible flow diagram for the invented method to de-NORM and partially de-salt readily and sufficiently de-oiled produced water.

The precipitation process can be employed in three stages as a standalone process for the selective and sequential removal of NORM, brucite, and calcium in the form of chloroaluminate or chloroferrate from readily and sufficiently de-oiled produced water. FIG. 4 depicts a simplified possible flow diagram illustrating the three stages of the precipitation process to de-NORM and partially de-salt produced water. In the first stage, the de-oiled produced water [10] will be pre-mixed with a sufficient amount of sulfate-rich saline water [12] to allow the concentration of sulfate (meq./L) to exceed the concentration of strontium (meq./L) in the blended saline stream [14] (Table 2). Alternatively, the de-oiled produced water [10] will be pre-mixed with a sufficient amount of aluminum sulfate or iron sulfate [12] (instead of sulfate-rich saline stream) to allow the concentration of sulfate (meq./L) to exceed the concentration of strontium (meq./L) in the blended saline stream. It should be pointed out that if strontium isotopes in produced water do not include Sr-87 (the radiogenic isotope), then the precipitation process would target the removal of barium and radium decay series to substantially minimise the use of sulfate-rich saline stream or the use of aluminum or iron sulfate.

The blended saline stream [14] (the de-oiled produced water with a sufficient amount of sulfate-rich saline water; or a sufficient amount of aluminum sulfate or iron sulfate) will be injected into the first precipitator unit [16] preferably via the inner tube of at least one concentric nozzle [18]. The pressure of such a blended saline stream is between 30 and 1,100 psi. A selected amine solvent will simultaneously be injected [20] into the same precipitator unit [16] at a pressure ranging between 30 psi and the critical pressure of the amine solvent preferably through the coaxial annulus of the same concentric nozzle [18].

The outlet stream from the first precipitator unit [16] will be fed into the first thickener-stage of hydrocyclones [22] to separate the formed precipitates (mainly barium, radium and radium's decay series). The slurry in the under flow stream [24] of the hydrocyclones [22] will be dewatered by a vacuum filter [26]. The dewatered precipitates [28] will be transferred to a suitable disposal site (if they are radioactive) or recovered as a commodity (if they are not radioactive). The recovered water [30] from the vacuum filter [26] that may contain very fine precipitates will be recycled to the bottom of the first precipitator unit [16]. The recovered amine solvent [32] from the vacuum filter [26] will be recycled to the amine storage tank [82].

In the second stage of the precipitation process, brucite is targeted for selective separation from produced water. The over flow stream [34] from the first stage of hydrocyclones [22] that is depleted of mainly barium, radium and radium's decay series will be injected into the second precipitator unit [36] preferably via the inner tube of at least one concentric nozzle [38]. The pressure of such a stream [34] is between 30 and 1,100 psi. The amine solvent [40] will simultaneously be injected into the second precipitator unit [36] at a pressure ranging between 30 psi and the critical pressure of the amine solvent preferably through the coaxial annulus of the same concentric nozzle [38] to selectively precipitate brucite.

The outlet stream from the second precipitator unit [36] will be fed into the second thickener-stage of hydrocyclones [42] to separate the formed brucite precipitates from the stream. The brucite slurry in the under flow stream [44] of the hydrocyclones [42] will be dewatered by a vacuum filter [46]. The dewatered brucite precipitates [48] will be recovered as a commodity and the recovered water [50] that may contain very fine precipitates will be recycled to the bottom of the second precipitator unit [36]. The recovered amine solvent [52] will be recycled to the amine storage tank [82].

In the third stage of the precipitation process, calcium chloroaluminate or calcium chloroferrate is targeted for selective separation from produced water. The over flow stream [54] from the second stage of hydrocyclones [42] (depleted of mainly barium, radium, radium's decay series, and brucite) will be mixed with a sufficient aluminum or iron source [84] via a chemical eductor (not shown) and injected into the third precipitator unit [56] preferably via the inner tube of at least one concentric nozzle [58]. The pressure of such a stream [54] will be between 30 and 1,100 psi. The selected amine solvent will simultaneously be injected [60] into the third precipitator unit [56] at a pressure ranging between 30 psi and the critical pressure of the amine solvent preferably through the coaxial annulus of the same concentric nozzle [58] to selectively precipitate calcium chloroaluminate or calcium chloroferrate.

The chloride concentration ion in produced water is roughly about 4-times the calcium concentration. As such, the addition of a calcium source such as lime or hydrated lime would: (1) not only increase the amount of the precipitated calcium chloroaluminate or chloroferrate but also would minimize, if not eliminate, the use of the amine solvent (furnish the hydroxide ion); and (2) reduce the TDS of the treated produced water (binding with an additional amount of the chloride ion) to make it more amenable to desalination methods. It should be understood therefore that the addition of lime or hydrated lime could replace the addition of the amine solvent [60] into the third precipitator unit [56]. In this case, lime or hydrated lime (instead of an amine solvent) along with an aluminum or iron source [84] can be mixed via a chemical eductor (not shown) with the over flow stream [54] from the second stage of hydrocyclones [42]. It is worth noting that the over flow stream [54] still contains a large portion of the injected amine solvent in the first two precipitation stages.

The outlet stream from the third precipitator unit [56] will be fed into the third thickener-stage of hydrocyclones [62] to separate the formed precipitates of calcium chloroaluminate or chloroferrate from the stream. Precipitates slurry in the under flow stream [64] of the hydrocyclones [62] will be dewatered by a vacuum filter [66]. The dewatered precipitates of calcium chloroaluminate or calcium chloroferrate [68] will be recovered as a commodity and the recovered water [70] that may contain very fine precipitates will be recycled to the bottom of the third precipitator unit [56]. The recovered amine solvent [72] will be recycled to the amine storage tank [82].

The over flow stream [74] of the third stage of hydrocyclones [62] that contains the amine solvent and produced water (rich with nearly sylvinite) will be fed into a vapor-liquid equilibrium based stripping unit [76] to separate the sylvinite-rich produced water [78] from the amine solvent [80]. The stripping unit could be a flash drum, a vacuum or standard distillation tower, a vacuum membrane distillation, a vacuum de-aerator, or a pervaporation. The recovered amine solvent [80] will be recycled to the amine storage tank [82]. The nearly sylvinite-rich produced water [78] can be used for, but not limited to, oil-gas fields' saline water injection operations or fire extinguishing in oil fields or dust control.

It should be understood that multiple precipitator units in each stage of the precipitation process instead of a single precipitator unit can be implemented as needed.

It should also be understood that multiple concentric nozzles can be installed within a single precipitator unit in any given stage of the precipitation process.

It should also be understood that the amine solvent (or sulfate-rich saline water or other additives) and produced water can be injected into the precipitator unit via two or multiple but separate spray nozzles.

It should also be understood that the amine solvent (or sulfate-rich saline water or other additives) and produced water can be co-injected via a mixing twin-fluid nozzle or multiple mixing twin-fluid nozzles before entering the precipitator unit.

It should also be understood that hydrocyclones in the precipitation process can be eliminated, and thus vacuum filters would be the main filtration units. One of the purposes of using vacuum filters is to capture and provide better recovery for the amine solvent.

It should also be understood that the precipitation process can be implemented, for instance, in: (1) a single-stage to only de-NORM produced water; or (2) a dual-stage to de-NORM produced water and then to recover brucite; or (3) a triple-stage to de-NORM produced water and then to separately and sequentially recover brucite and calcium chloroaluminate or chloroaferrate; or (4) a dual-stage to de-NORM produced water in the first stage and then to recover a blend of brucite and calcium chloroaluminate or chloroaferrate in the second stage. The treated produced water from such processing schemes can also be used, but not limited to, for oil-fields water injection operations, fire extinguishing, or dust control.

Integration of the Precipitation Concept with the Hydrophobic Membranes Concept

Figure 5:
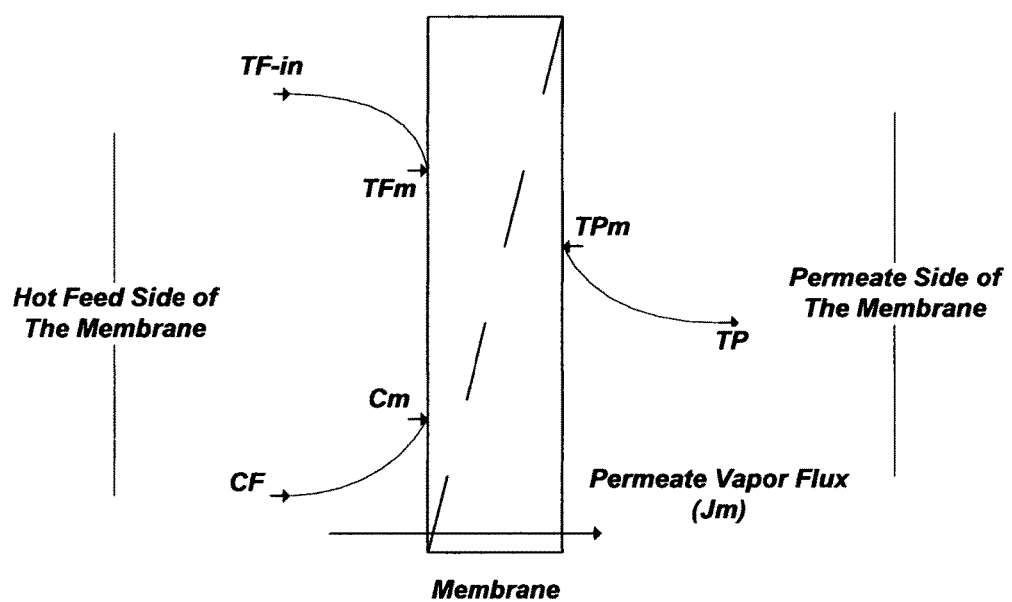
FIG. 5 illustrates a simplified schematic diagram for the flow direction and the polarization of temperature and concentration in Membrane Distillation.

Membrane Distillation (MD) refers to the transport of the vapor phase through pores of a hydrophobic membrane that separate two liquid streams. The liquid streams cannot enter the membrane pores unless the applied pressure is greater than the specified "capillary or liquid entry" pressure for the porous partition of a given membrane. In the absence of such a pressure, vapor-liquid interfaces are formed on both sides of the membrane pores due to surface tension forces. Under these conditions, if a temperature difference is applied, a vapor pressure gradient will be created on both interfaces. Evaporation will take place at the hot membrane interface (feed), water vapor will transport through the membrane pores with a convective and/or diffusion mechanism, and vapor condensation will take place at the cold side of the membrane interface (permeate). Thus, the net permeate vapor flux will be from the hot feed stream to the cold condensate stream. FIG. 5 shows a schematic diagram for the flow direction in MD.

MD has several clear advantages compared to conventional pressure-driven membranes (e.g., RO) or thermal-driven (e.g., MSF, ME and the like) desalination processes. First, MD can take place at a very low pressure that is slightly above atmospheric pressure (e.g., 15 psi), which is contrary to RO that ought to be operated at high pressures (e.g., 1,100-1200 psi) to exceed the natural osmotic pressure of the saline stream (e.g., seawater) and to achieve the required recovery. It is worth noting that RO is inapplicable to most produced waters due to their high osmotic pressures.

Second, MD can be conducted at temperatures that are significantly lower than the boiling point of water (e.g., 40-70° C.). Any form of waste heat (e.g., the inherited thermal energy within produced water along with gas flares within the producing oil-gas fields or gathering centers) or low grade energy sources (wind, solar, geothermal, or solar ponds) can be used to operate MD.

Third, the MD product stream from any saline streams that contain non-volatile ions is an ultra-pure. Entrainment of dissolved ions in the product stream, as in the case with RO (or NF), is avoided. For an oil producer, the MD product stream would be ideally suited for applications such as enhanced oil recovery (EOR) by stream injection or de-salting crude oil (wash water).

Fourth, the evaporation surface of MD can be made similar to the available various pressure-driven membrane modules (e.g., hollow fiber, spiral wound, etc.). The modularity of MD thus allows the ease of adding processing capacity as needed.

The apparent simplicity of MD, however, obscures complex and simultaneous mass and heat transfer interactions. The mass water vapor flux in MD is a function of the "membrane permeability coefficient" ($K_m$) and the vapor pressure difference across the membrane:

$$J_m = K_m [p_{Fm}^s(T_{Fm}) - p_p] \tag{3}$$

where $p_{Fm}^s$ is the saturated vapor pressure of the hot feed stream at the membrane surface temperature ($T_{Fm}$) rather than the bulk (inlet) feed temperature ($T_F$), and $p_p$ is the permeate stream pressure. $K_m$ is a function of the membrane structure such as porosity ($\varepsilon$), pore size radius (r), thickness ($\delta$), and tortuosity ($\chi$):

$$K_m = \frac{2\varepsilon r}{3\chi\delta} \frac{1}{RT} \sqrt{\frac{8RT}{\pi}} \tag{4}$$

$T_{Fm}$, as the driving force for the water vapor flux across the membrane, not only affects the vapor-liquid equilibrium in the feed stream but also affects the hydrodynamics in the feed stream liquid phase since its dependent on salts concentrations at the membrane surface.

As water evaporation in MD takes place, the viscosity of saline water feed stream increases with increasing salts concentrations. This would elevate the osmotic pressure, depress the vapor pressure, and alter heat and mass transfer coefficients across the membrane boundary layers. The saturated vapor pressure of saline water can be related to its osmotic pressure as follows:

$$p_{Fm}^s = \frac{p^o}{\exp\left[\frac{\Pi_{Fm}\tilde{v}_w}{RT_{Fm}}\right]} \tag{5}$$

where at $T_{Fm}$, $p_{Fm}^s$ is the saturated vapor pressure of a saline stream (mmHg), $p^o$ is the vapor pressure of pure water (mmHg), $\Pi_{Fm}$ is the osmotic pressure of a saline stream (psi), $\tilde{v}_w$ is the water molar volume (L/gmol), and R is the ideal gas constant (L psi/gmol K).

$p^o$ can be accurately estimated using Antoine equation. The osmotic pressure ($\Pi_{Fm}$) of a saline stream can be estimated as follows:

$$\Pi = 1.19 \, T_{Fm} \Sigma M_i \tag{6}$$

where $M_i$ is the molar concentration of individual ions (mol/L).

Eqs. (3) to (5) imply that in order to enhance or achieve an acceptable level of the water vapor flux, the value of either $K_m$ or $T_{Fm}$ or both values must be increased. As given in Eq. (4), the membrane structure is the key to optimize $K_m$. The $K_m$ value of hydrophobic membranes is typically very low (e.g., about 0.21 Kg/m²·hr·mmHg) to prevent water in the liquid phase from passing through the membrane pores. A slight increase in the $K_m$ value is possible, which could drastically improve water vapor flux, but it should not be at the expense of the loosing the membrane hydrophobicity. As such, a balance ought to be strike between improving the value of $K_m$ and maintaining the membrane hydrophobicity.

$K_m$ is also, to some degree, temperature dependent (decreases by 3% with a 10° C. increase in the mean temperature). The molecular mean free path for water vapor at 60° C. is about 0.3 µm. If convective transport is dominant across the membrane, the controlling factor will be the membrane pore size. If diffusive transport is dominant, however, the controlling factor will be the average mole fraction of air present within the membrane pores. Using inappropriate small membrane pore size combined with an increase in the feed stream temperature range (e.g., above 60° C.) could subsequently lead to an unintended reduction in $K_m$.

The key in increasing the value $T_{Fm}$ lies within: (1) the type of the condensation method on the permeate side of the membrane; (2) the characteristics of the membrane module and flow regime along with operating conditions including the feed stream temperature and flow rate and the permeate stream pressure; and (3) controlling the solubility limits of inorganic salts in the saline feed stream, particularly the sparingly soluble salts that pare scale prone species.

De-NORM and Partially De-Salt/De-Ionize Produced Water

If the precipitation process is used to de-NORM and partially de-salt produced water (as given in the processing steps of FIG. 4), then the treated produced water will be nearly rich with sylvinite. The precipitation process would thus allow the operation of MD in a scale-free manner to produce de-ionized water and sylvinite.

Figure 6:
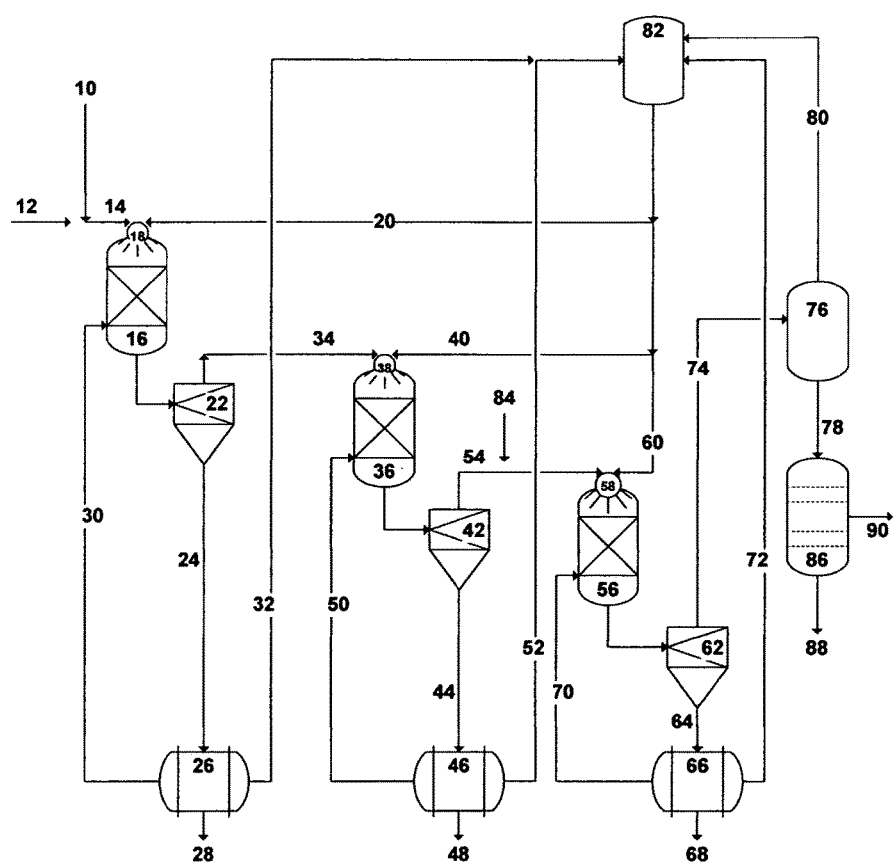
FIG. 6 illustrates a possible flow diagram for the invented method to de-NORM, and partially de-salt and de-ionize readily and sufficiently de-oiled produced water.

FIG. 6 shows an oversimplified flow diagram for the integration of the precipitation process with MD to de-NORM, partially de-salt, and de-ionize produced water. The processing steps [10-84] in FIG. 6 are identical to the previously described processing steps [10-84] in FIG. 4. As shown in FIG. 6, MD [86] will be conducted to produce de-ionized water [88] and sylvinite rich stream or shiny [90]. Depending on the saturation level of the rejected sylvinite-rich stream [90], it can be partially recycled to the produced water feed stream [10] or recovered as a slurry or salt.

De-Oil, De-NORM and Partially De-Salt/De-Ionize Produced Water

The natural demulsification of oil-brine liquid phases starts in some oil reservoirs where oil might preferentially squeeze through the narrow pores of organically surface coated rocks (e.g., oil wet sandstone, limestone, or dolomite) and trapped by impermeable rocks (e.g., clay or shale). In such a natural downhole capillary flow, no shear or differential velocity (velocity is in the direction of the flow) or oil droplets rotation are induced. Thus, capillary flow is the most efficient method to separate oil droplets from water.

My de-oiling concept is simply analogous to the natural demulsification phenomenon of crude oil [my U.S. Pat. Nos. 7,934,551, 7,963,338, and 8,915,301]. The concept takes advantages of the facts that dispersed oil droplets and produced water are immiscible and a properly configured hydrophobic membrane would efficiently repel water (the non-wetting liquid) and allow oil droplets (the membrane wetting species) to permeate through the hydrophobic membrane by applying a very low pressure.

However, such water repellent membranes do not permit passage of water through the membrane until the water capillary pressure ($p_c$) of the membrane is exceeded. $p_c$ depends on the interfacial tension, contact angle, and the pore size distribution of the membrane as reflected by the following relation:

$$p_c = \frac{2\tau_{w-o} \cos\theta_{w-0}}{r} \quad (7)$$

where $\tau_{w-o}$ is the water-oil interfacial tension, $\theta_{w-o}$ is the contact angle of a water droplet on the membrane surface in the presence of oil, r is the radius of the membrane pore.

The value of the $\theta_{w-o}$ can be related to various interfacial tensions as follows:

$$\cos\theta_{w-o} = \frac{\tau_{m-w} - \tau_{m-o}}{\tau_{w-o}} \quad (8)$$

where $\tau_{m-w}$ is interfacial tension of a membrane in contact with water, and $\tau_{m-o}$ is the interfacial tension of the same membrane in contact with oil. If $\tau_{m-w}$ is greater than $\tau_{m-o}$, then the membrane is hydrophobic ($0<\theta_{w-o}<90°$). This means that the value of $p_c$ is positive and thus the membrane is oil wet that permits the passage of oil droplets and repels water. If, however, $\tau_{m-w}$ is lower than $\tau_{m-o}$, then the membrane is hydrophilic ($\theta_{w-o}>90°$). This means that the value of $p_c$ is negative, and the membrane is water wet that permits the passage of water and prevents oil droplets from entering the membrane pores against the applied pressure ($p_a$).

Figure 7:
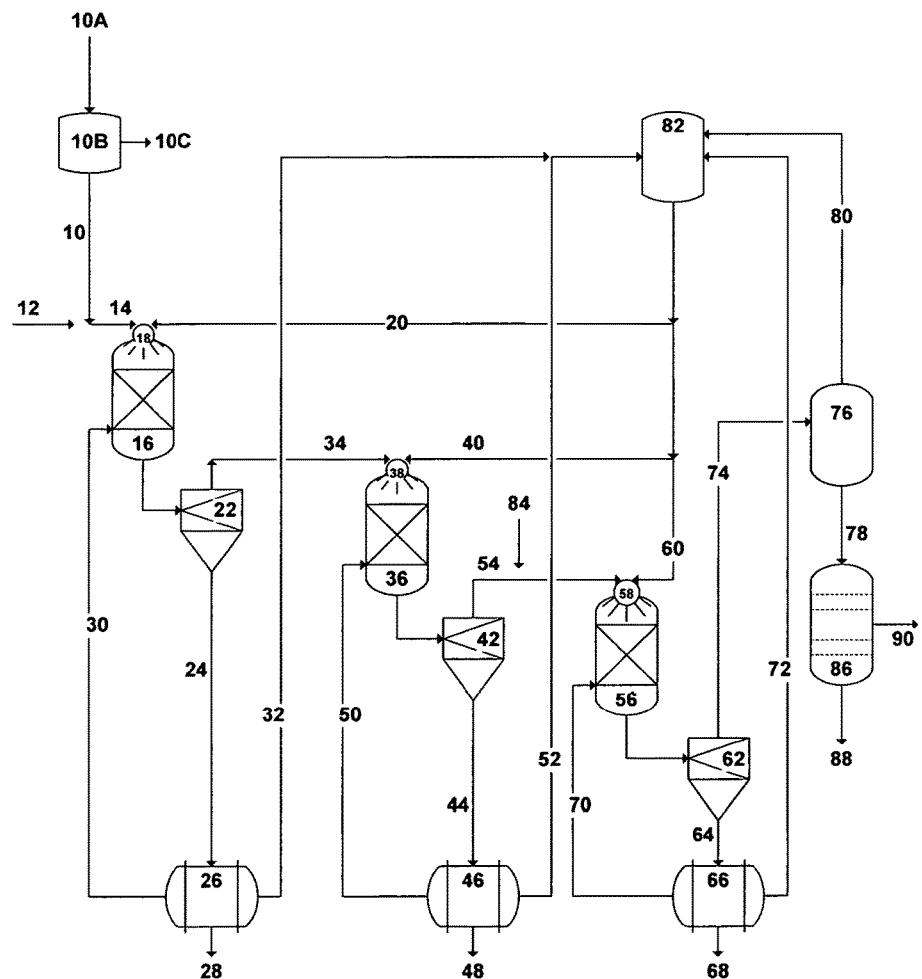
FIG. 7 illustrates a possible flow diagram for the invented method to de-oil, de-NORM, and partially de-salt and de-ionize produced water.

FIG. 7 shows the integration of produced water de-oiling step with the de-salting and de-ionizing steps. Oil-fields produced water [10A] will be fed into a stage of hydrophobic membranes [10B] to recover oil droplets in a near pure form [10C] from produced water [10]. The applied pressure ($p_a$) in this stage will be below the capillary pressure of water ($p_c$) so that hydrophobic membranes repel water and allow only the passage of oil droplets as a product stream.

The de-oiled produced water [10] will then be treated by the precipitation process as a standalone (FIG. 4) or the integrated precipitation-MD process (FIG. 6). The processing steps [10-84] in FIG. 7 are identical to the previously described processing steps [10-84] in FIG. 4. The processing steps [10-90] in FIG. 7 are identical and to the previously described processing steps [10-90] in FIG. 6.

The de-NORMing, de-scaling and de-salting methods as well as the de-oiling, de-NORMing, de-scaling and de-salting methods are given in my U.S. Pat. No. 8,915,301 (the elected claims in my original application Ser. No. 13/066, 841, filed Apr. 26, 2011). The non-elected claim in my original application Ser. No. 13/066,841 is essentially the invention of this continuation-in-part application to de-sulfate seawater and the like of sulfate-rich streams as given below.

De-Sulfation of Sewater and the Like of Sulfate-Rich Streams

If the precipitation process is integrated with, for example, thermal-driven seawater desalination processes to effectively deplete both alkaline (magnesium hydroxide) and sulfate (calcium sulfate) scale, the remaining salts in seawater would be nearly sodium-potassium chloride (sylvinite). In such a situation, any existing MSF desalination plant may easily achieve a concentration factor of 2.5 at the plant's top brine temperature ($T_{TB}$) range (90-110° C.). Table 3 presents the simulated conditions at three different values of $T_{TB}$ for a recently built MSF plant in the Arabian Gulf. The precipitation process is assumed to be integrated with an existing MSF plant (without changing the number of stages in the MSF train) to simultaneously deplete magnesium (about 1 mg/L) and sulfate (about 10-50 mg/L) from seawater at the start-up of the plant operation. However, the chemical consumptions of the precipitation process may be significant to treat seawater and reduce its sulfate concentration from 3,100 mg/L to 10-50 mg/L. As such, one of the main objectives of integrating the precipitation process with MSF plants is to recycle as much as feasible reject brine, and thus lower concentration sulfate in the recycle brine (a portion of the de-scaled reject brine+seawater) as well as increase the performance (distillate production) of the plants.

Inspection of Table 3 reveals several important issues. First, the highest recycle brine, and thus the lowest sulfate concentration to be treated by the precipitation process, is at the lowest $T_{TB}$ value (90° C.). As such, after the plant reaches a steady state, the sulfate concentration in the recycle brine that requires de-sulfation is about 270 mg/L, which may reduce the operating cost of the precipitation process. It is worth noting, however, that the chemical consumption of the precipitation process to de-sulfate the recycle brine (415 mg/L of sulfate) at $T_{TB}$ value of 110° C. (lower volume) is insignificant compared to de-sulfate (270 mg/L of sulfate) the recycle brine at $T_{TB}$ value of 90° C. (higher volume). It is also worth noting that the solubility limit of calcium sulfate hemihydrate, for instance, at a 2.5 concentration ratio is 3,300 mg/L at 110° C. Therefore, a partial rather than substantial removal of sulfate is feasible to optimize the usage of additives and to operate the MSF plant away below the saturation limit of calcium sulfate.

Second, the brine blow down temperature ($T_B$) at the three different $T_{TB}$ values is 58° C. As such, the number of stages in the heat recovery train can be expanded to produce more distillate without increasing the steam load. The expansion in the number of stages is controlled by the temperature drop per stage ($T_{SD}$). If the final $T_B$ is set to be 40° C., then about 8 stages (at $T_{TB}$: 110° C.) to 12 stages (at $T_{TB}$: 90° C.) may be added, which may increase distillate production by about 50%. Clearly, the lowest $T_{SD}$ (1.39° C.) provides the largest expansion of number of stages. However, this means reduction in the temperature driving force which demands an increase in the heat transfer areas of pre-heater/condenser tubes. In addition, the boiling point elevation of the recycle brine at about 2.5 concentration ratio would slightly increase.

Third, the de-scaled reject brine is ideal for oil-gas fields' water injection operations and/or for chlor-alkali industries as a feed stock.

It should be pointed out that the precipitation process can also facilitate operating a larger MSF plant (e.g., may double the number of stages in each MSF train) at a higher concentration ratio (e.g., 3.5) and $T_{TB}$ range (e.g., 120-150° C.). This would allow better performance ratio (e.g., 20), higher distillate production at a low cost, and a steady operation (due to better performance of heat transfer coefficients).

Figure 8:
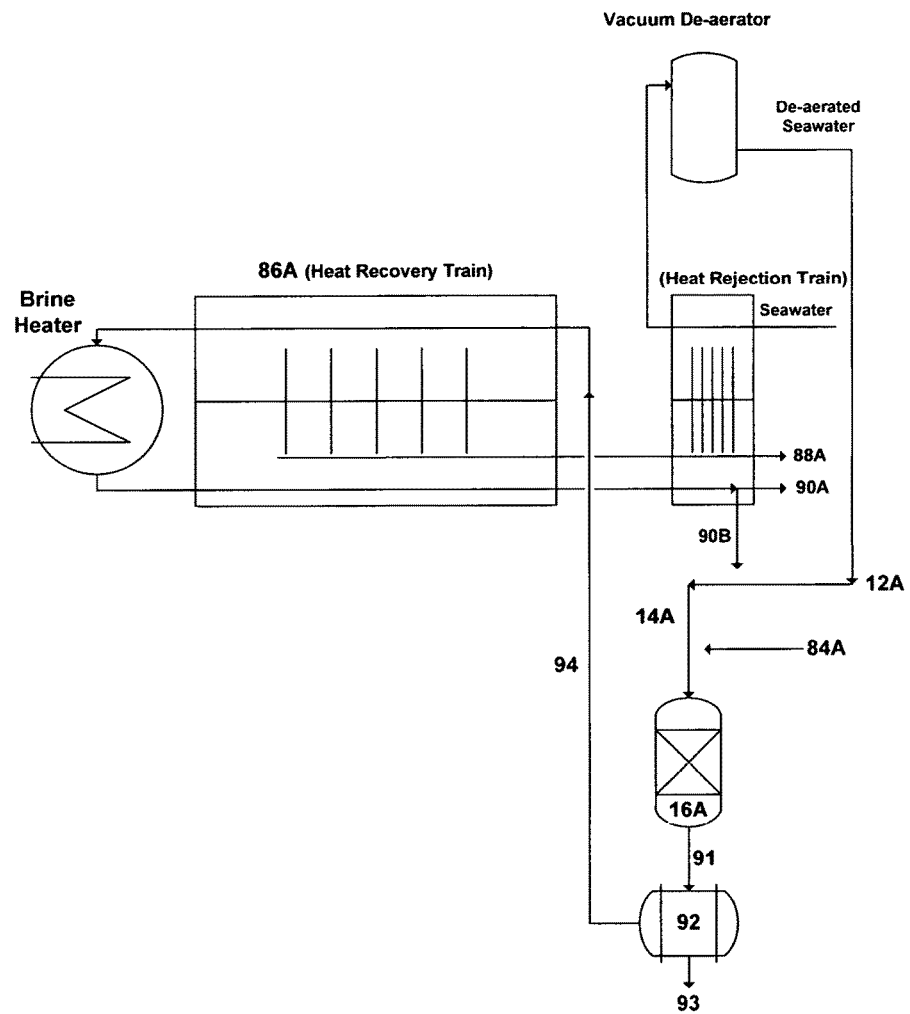

FIG. 8, for example, depicts a simplified flow diagram for the integration of the precipitation process with an existing MSF plant by a simple inventive modification. The precipitation of both magnesium and sulfate ions (along with minor scale and regulated species such as calcium carbonate, silica and boron) is simultaneously targeted by the precipitation step. Sulfate can be precipitated as calcium sulfoaluminate or calcium sulfoferrate. As such, a sufficient source of aluminum or iron along with a sufficient calcium source at a relatively high pH are required to properly engage the existing concentrations of calcium and sulfate ions: (1) in seawater at the start-up of the operation; and then (2) in the recycle brine (a portion of the de-scaled reject brine+ seawater) once the plant reaches the feasible minimal ratio of seawater make-up to the de-scaled reject brine (and thus the feasible minimal concentration of sulfate; e.g., Table 3).

The possible aluminum sources are calcium chloroaluminate, calcium aluminate, sodium aluminate, aluminum acetate, aluminum chloride, aluminum hydroxide, aluminum nitrate, aluminum sulfate, or a combination thereof. The possible iron sources are calcium chloroferrate, calcium ferrate, sodium ferrate, iron nitrate, iron hydroxide, iron chloride, or a combination thereof. The possible calcium sources are lime or hydrated lime. However, calcium chloroaluminate or calcium chloroferrate that can be produced locally from oil-gas fields produced water could meet the dual need for calcium-aluminum or calcium-iron.

As shown in FIG. 8, the de-aerated seawater [12A] from the existing vacuum de-aerator within the MSF plant (the original setup of the MSF plant) at the start-up of the operation will be mixed with appropriate amounts of either a calcium-aluminum source or a calcium-iron source [84A] and injected into the precipitator unit [16A] via a premixing device (not shown) to precipitate brucite along with calcium sulfoaluminate or calcium sulfoferrate. The outlet stream [91] from the precipitator unit [16A] will be fed to a filtration unit [22] (preferably, but not limited, to a vacuum filter) to separate the formed precipitates [93] from the de-scaled seawater [94]. The dewatered precipitates [93] will be recovered as a commodity whereas the de-scaled seawater [94] will be fed to the last stage of the MSF heat recovery train [86A] to produce the distillate [88A] and de-scaled reject brine [90A]. Once the MSF plant reaches a steady state by establishing the feasible minimal ratio of the de-aerated seawater make-up [12A] to the de-scaled reject brine [90A] (and thus the feasible minimal concentration of sulfate), an appropriate portion of the de-scaled reject brine [90B] from the last stage of the MSF heat rejection train will be mixed with an appropriate volume of the de-aerated seawater [12A] as a make-up to form recycle brine [14A]. The recycle brine [14A] will then be mixed with appropriate amounts of either the calcium-aluminum source or the calcium-iron source [84A] and injected into the precipitator unit [16A] via the premixing device (not shown) to precipitate brucite along with calcium sulfoaluminate or calcium sulfoferrate. The outlet stream [91] from the precipitator unit [16A] will be fed to the filtration unit [92] to separate the formed precipitates [93] from the de-scaled recycle brine [94]. The de-scaled recycle brine [94] will be fed to the last stage of the MSF heat recovery train [86A] to produce distillate [88A] and de-scaled reject brine [90A]. The remaining portion of the de-scaled reject brine [90A] may be blown down, or preferably be used for applications such as, but not limited to, oil-gas fields' injection operations to improve hydrocarbons recovery and/or a feed stock for chlor-alkali industries. The preference of using a vacuum filter [92] in conjunction with other filtration units (e.g., a hydrocyclone, a press filter, a centrifuge, etc.) or as a standalone is that it also de-aerates the de-scaled seawater or the de-scaled recycle brine [94] before it enters the heat recovery train [86A]. It is worth noting that the precipitation process may easily allow increasing the number of stages in the heat recovery train without increasing the steam load.

Figure 9:
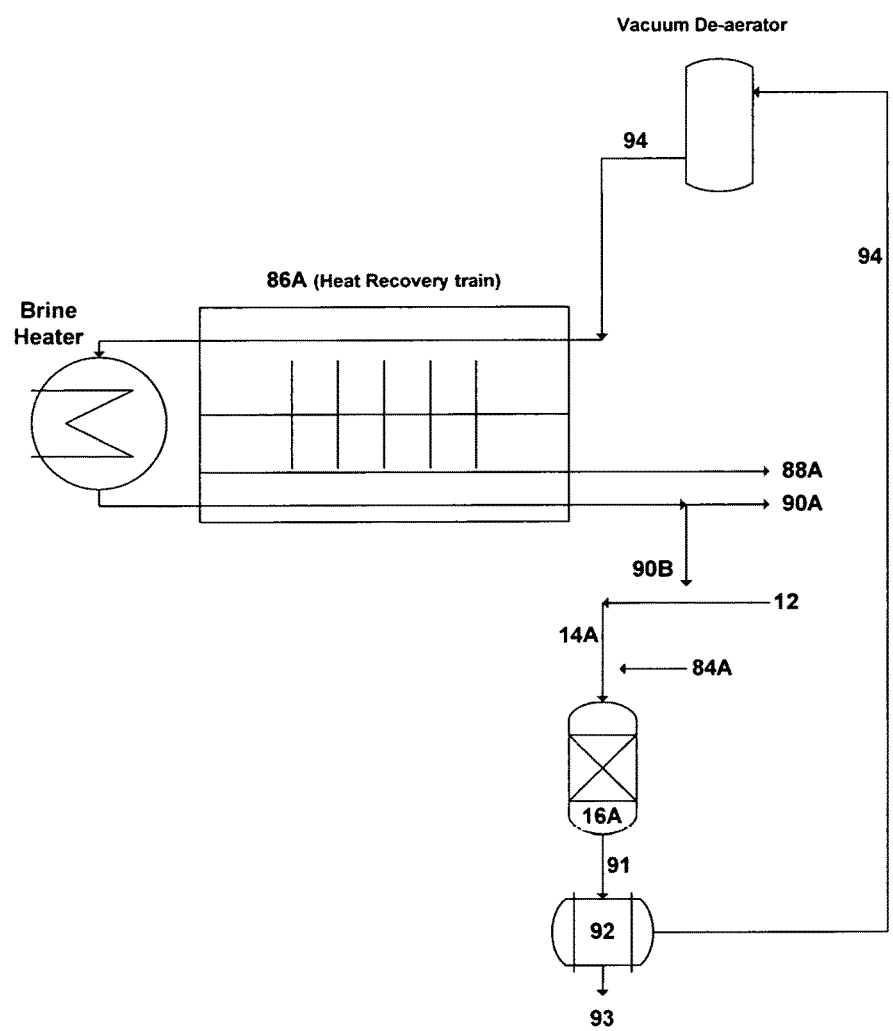

Alternatively, FIG. 9 depicts another simplified possible flow diagram for integrating the precipitation process with an existing or a newly designed MSF plant. As shown in FIG. 9, the 3 stages of a conventional MSF heat rejection train may be combined with the 20 stages of the heat recovery train, and the vacuum de-aerator of the conventional MSF plant may be kept or entirely eliminated. It should be pointed out that the stages of the heat recovery train may be further expanded without increasing the steam load. Seawater [12] at the start-up of operating the MSF plant will be mixed with appropriate amounts of either a calcium-aluminum source or a calcium-iron source [84A] and injected into the precipitator unit [16A] via a premixing device (not shown) to precipitate brucite along with calcium sulfoaluminate or calcium sulfoferrate. The outlet stream [91] from the precipitator unit [16A] will be fed to a filtration unit [92] to separate the formed precipitates [93] from the de-scaled seawater [94]. The dewatered precipitates [93] will be recovered as a commodity, and the de-scaled seawater [94] will be fed to the last stage of the MSF heat recovery train [86A] directly or through the existing vacuum de-aerator of the MSF plant to produce distillate [88A] and de-scaled reject brine [90A]. Once the MSF plant reaches a steady state by establishing the feasible minimal ratio of seawater make-up [12] to the de-scaled reject brine [90A], an appropriate portion of the de-scaled reject brine [90B] from the last stage of the MSF heat recovery train will be mixed with an appropriate volume of seawater [12] as a make-up to form a recycle brine [14A]. The recycle brine [14A] will then be mixed with appropriate amounts of either the calcium-aluminum source or the calcium-iron source [84A] and injected into the precipitator unit [16A] via the premixing device (not shown) to precipitate brucite along with calcium sulfoaluminate or calcium sulfoferrate. The outlet stream [91] from the precipitator unit [16A] will be fed to the filtration unit [92] to separate the formed precipitates [93] from the de-scaled recycle brine [94]. The de-scaled recycle brine [94] will be fed to the last stage of the MSF heat recovery train [86A] directly (not shown in FIG. 9) or through the existing vacuum de-aerator of the MSF plant to produce distillate [88A] and de-scaled reject brine [90A]. The remaining portion of the de-scaled reject brine [90A] may be blown down, or preferably be used for applications such as, but not limited to, oil-gas fields' injection operations to improve hydrocarbons recovery and/or a feed stock for chlor-alkali industries.

Oil producers and refineries, for instance, in water restricted, water shortage, or arid areas may be forced to seek out independent water sources and water desalination processes to satisfy the need for water distillate (e.g., for steam generation to enhance oil recovery, wash/de-salt crude oil, etc.) as well as sulfate-depleted water sources for improved oil-gas fields' water injection operations. The capacities of desalination systems for such purposes tend to be much smaller than the capacities of conventional seawater desalination plants, and the amounts of the produced scale-infested reject brine are much larger than the amounts of produced distillate. However, the integration of the precipitation process with desalination processes for such purposes would be ideal to produce both the much needed distillate and de-scaled reject brine. Such an integration may also be facilitated by blending an optimum amount of a sulfate-rich saline stream with, for instance, brackish water that contains a comparable TDS but partially sulfate-rich (e.g., Table 1: S6+S7 at different volume ratios) to reduce the sulfate concentration in the blend stream, and then by applying the same inventive theme of recycling as much as feasible of the de-scaled reject brine from a selected desalination process to lower further the concentration of sulfate in the recycle brine.

TABLE 1

Samples of Saline Streams.

| Ion | S1 | S2 | S3 | S4 | S5 | S6 | S7 |
|---|---|---|---|---|---|---|---|
| Cations | | | | | | | |
| $Na^+$ | 68,959 | 12,170 | 11,990 | 20,090 | 23,240 | 7750 | 4,800 |
| | (2,998.2) | (529.1) | (521.3) | (873.5) | (1,010.4) | (337) | (209) |
| $K^+$ | 2,851 | 420 | 93 | 1,024 | 740 | 380 | 49 |
| | (72.9) | (10.7) | (2.4) | (26.2) | (18.9) | (9.7) | (1.3) |
| $Mg^{+2}$ | 3,198 | 1,530 | 190 | 2,330 | 2,890 | 600 | 513 |
| | (263.2) | (125.9) | (15.6) | (191.7) | (237.8) | (49.4) | (42.2) |
| $Ca^{+2}$ | 19,014 | 540 | 498 | 837 | 1,750 | 2,350 | 1,320 |
| | (950.7) | (27) | (24.9) | (41.9) | (87.5) | (117.5) | (66) |
| $Sr^{+2}$ | 535 | 7 | 28 | 21 | | 70 | |
| | (12.2) | (0.2) | (0.6) | (0.5) | | (0.8) | |
| $Ba^{+2}$ | 10 | | | | | | |
| | (0.2) | | | | | | |
| Anions | | | | | | | |
| $Cl^-$ | 150,948 | 22,100 | 17,970 | 36,164 | 40,650 | 16,400 | 9,300 |
| | (4,258.1) | (623) | (506.9) | (1,020.1) | (1,146.7) | (462.6) | (262) |
| $HCO_3^-$ | 256 | 140 | 20 | 256 | 160 | 245 | 100 |
| | (4.2) | (2.3) | (0.3) | (4.2) | (2.6) | (4.0) | (1.6) |
| $SO_4^{-2}$ | 108 | 3,100 | 3,045 | 5,099 | 5,430 | 2,950 | 1,300 |
| | (2.3) | (64.6) | (63.4) | (106.2) | (113.1) | (61.5) | (27.1) |

Ion concentration: mg/L (meq./L); S1: chloride-type produced water; S2: seawater; S3: sulfate-rich natural brine; S4: RO reject brine from seawater treatment; S5: MSF reject brine from seawater treatment; S6: sulfate-rich produced water; S7: brackish water.

Figure 10:
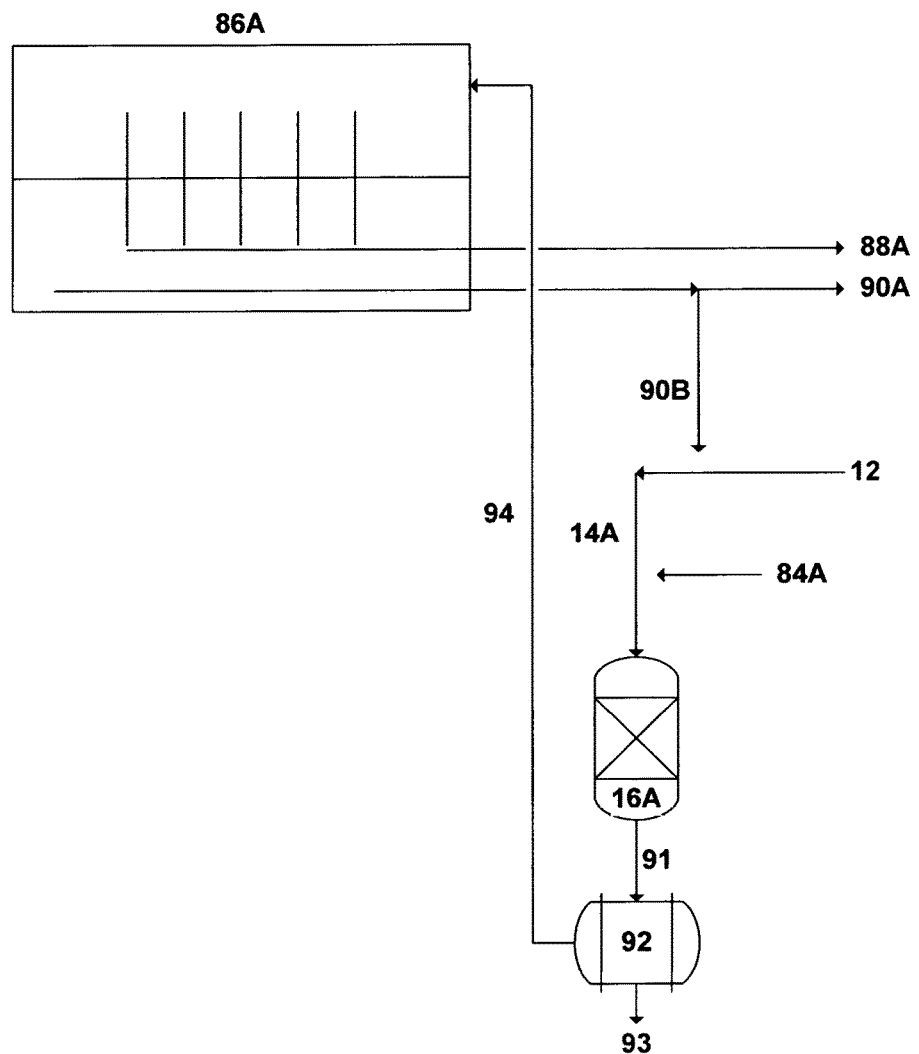
FIG. 10 illustrates a further possible flow diagram for integrating the invented method with desalination processes.

As shown in FIG. 10, the precipitation process may also be integrated with desalination processes such as multi-effects (ME), thermal or mechanical vapor recompression (VR), MD (e.g., vacuum membrane distillation, direct contact membrane distillation, and osmotic membrane distillation), smaller MSF, forward osmosis (FO) or reverse osmosis (RO) by applying the same inventive theme ([12, 14A, 16A, 84A, 88A, 90A, 90B, and 91-94]) as shown in FIG. 9, and described above) to enhance the productivity and performance of such desalination processes [86A]. However, depending on the salinity and consequently the osmotic pressure of the sulfate-rich saline stream [12], a limitation on the volume of the reject brine for recycling may be imposed in the case of RO.

TABLE 2

Ions Material Balance: Produced Water + Sulfate-Rich Saline Streams.

| Ion | S1 + S2 (80% + 20%) (meq./L) | S1 + S3 (80% + 20%) (meq./L) | S1 + S4 (90% + 10%) (meq./L) | S1+ S5 (90% + 10%) (meq./L) |
|---|---|---|---|---|
| Cations | | | | |
| $Na^+$ | 2,504.0 | 2,495.0 | 2,786.0 | 2,799.0 |
| $K^+$ | 61.0 | 59.0 | 68.0 | 68.0 |
| $Mg^{+2}$ | 236.0 | 214.0 | 256.0 | 261.0 |
| $Ca^{+2}$ | 766.0 | 766.0 | 860.0 | 864.0 |
| $Sr^{+2}$ | 9.8 | 9.9 | 11.0 | 11.0 |
| $Ba^{+2}$ | ≈0.2 | ≈0.2 | ≈0.2 | ≈0.2 |

TABLE 2-continued

Ions Material Balance: Produced Water + Sulfate-Rich Saline Streams.

| Ion | S1 + S2 (80% + 20%) (meq./L) | S1 + S3 (80% + 20%) (meq./L) | S1 + S4 (90% + 10%) (meq./L) | S1+ S5 (90% + 10%) (meq./L) |
|---|---|---|---|---|
| Anions | | | | |
| $Cl^-$ | 3,531.0 | 3508.0 | 3934.0 | 3,947.0 |
| $HCO_3^-$ | 3.8 | 3.4 | 4.2 | 4.0 |
| $SO_4^{-2}$ | 14.8 | 14.5 | 12.7 | 13.4 |

S1: chloride-type produced water; S2: seawater; S3: sulfate-rich natural brine; S4: RO reject brine from seawater treatment; S5: MSF reject brine from seawater treatment.

TABLE 3

Projected Operating Conditions for a MSF Train.

| Assumed Variables: | | | |
|---|---|---|---|
| $C_S$ (mg/L) | 40,000 | 40,000 | 40,000 |
| $C_B$ (mg/L) | 100,000 | 100,000 | 100,000 |
| $C_B/C_S$ | 2.5 | 2.5 | 2.5 |
| $T_s$ (° C.) | 30 | 30 | 30 |
| $T_{TB}$ (° C.) | 110 | 100 | 90 |
| PR | 12 | 12 | 12 |
| # SHRS | 23 | 23 | 23 |
| $Q_D$ (kg/s) | 593 | 593 | 593 |
| Calculated Variables: | | | |
| $T_B$ (° C.) | 58.1 | 58.1 | 58.1 |
| $T_{SD}$ (° C.) | 2.26 | 1.82 | 1.39 |
| $Q_r$ (kg/s) | 6402 | 7,939 | 10,435 |
| $C_r$ (mg/L) | 90,740 | 92,530 | 94,319 |
| $Q_s$ (kg/s) | 988 | 988 | 988 |
| $Q_B$ (kg/s) | 395 | 395 | 395 |
| $Q_s/[Q_r + Q_s]$ (%) | 13.4 | 11.1 | 8.7 |
| $R\text{-}SO_4^{-2}$ (mg/L) | 415 | 344 | 270 |

$C_S$: TDS in seawater feed; $C_B$: TDS in reject brine; $C_B/C_S$: TDS ratio; $T_s$: seawater feed temperature; $T_{TB}$: top brine temperature; $P_R$: performance ratio; # SHRS: number of stages in the MSF train; $Q_D$: distillate flow rate; $T_B$: temperature of reject brine; $T_{SD}$: stage temperature drop; $Q_r$: recycle brine flow rate; $C_r$: TDS in recycle brine; $Q_s$: seawater flow rate; $Q_B$: flow rate of reject brine; $R\text{-}SO_4^{-2}$: sulfate in recycle brine.

What is claimed is:

1. A method for de-scaling a saline stream to produce a de-scaled saline stream to a desalination system, said desalination system produces distillate and de-scaled reject brine, said method comprising separating magnesium and sulfate by (a) mixing said saline stream with a calcium source and an aluminum source or an iron source to form a precipitate, comprising brucite and calcium sulfoaluminate or calcium sulfoferrate, in a precipitator unit; and (b) filtering said precipitate by a filter to produce said de-scaled saline stream.

2. The method of claim 1, wherein said saline stream is de-aerated prior to step (a).

3. The method of claim 1, wherein said desalination system further comprises mixing at least a portion of said de-scaled reject brine with at least a portion of said saline stream to produce a recycle brine stream, wherein said recycle brine comprises the steps of separating magnesium and said sulfate by:
  (a) mixing said recycle brine with said calcium source and said aluminum source or said iron source to form said precipitate, comprising said brucite and calcium sulfoaluminate or calcium sulfoferrate in said precipitator unit;
  (b) filtering said precipitate by said filter to produce a de-scaled recycle brine stream; and
  (c) feeding said de-scaled recycled brine to said desalination system.

4. The method of claim 3, wherein said de-scaled recycle brine is de-aerated prior to step (c).

5. The method of claim 1 or 3, wherein said saline stream is selected from the group consisting of seawater, brine from seawater desalination plants, natural brine, produced water, brackish water, flue gas desulphurization spent water, agricultural drainage water, acid mine drainage water, mineral slurry transport water, paper mills spent water, aluminum anodizing spent water, spent water from fertilizer production, lime slaking, spent water from textile production, and combinations thereof.

6. The method of claim 1 or 3, wherein said calcium source is selected from the group consisting of calcium chloroaluminate, calcium chloroferrate, lime, hydrated lime, and combinations thereof.

7. The method of claim 1 or 3, wherein said aluminum source is selected from the group consisting of calcium chloroaluminate, calcium aluminate, aluminum acetate, aluminum chloride, aluminum hydroxide, aluminum nitrate, and combinations thereof.

8. The method of claim 1 or 3, wherein said iron source is selected from the group consisting of calcium chloroferrate, calcium ferrate, sodium ferrate, iron hydroxide, iron nitrate, iron chloride, and combinations thereof.

9. The method of claim 1 or 3, wherein said filter is selected from the group consisting of a vacuum filter, a hydrocyclone, a centrifuge, a filter press, a microfilter, an ultrafilter, and combinations thereof.

10. The method of claim 1 or 3, wherein said desalination system is selected from the group consisting of a recycle-brine multi-stage flash desalination train, a once-through multi-stage flash desalination train, multi-effects distillation, vapor recompression, vacuum membrane distillation, direct contact membrane distillation, osmotic membrane distillation, forward osmosis, reverse osmosis, and combinations thereof.

* * * * *